United States Patent
Robertson et al.

(10) Patent No.: US 9,575,758 B2
(45) Date of Patent: Feb. 21, 2017

(54) METHOD FOR SETTING BREAKPOINTS, AND AN INTEGRATED CIRCUIT AND DEBUG TOOL THEREFOR

(75) Inventors: Alistair Robertson, Glasgow (GB); Mark Maiolani, East Kilbride (GB)

(73) Assignee: NXP USA, INC., Austin, TX (US)

( * ) Notice: Subject to any disclaimer, the term of this patent is extended or adjusted under 35 U.S.C. 154(b) by 580 days.

(21) Appl. No.: 13/879,240

(22) PCT Filed: Nov. 22, 2010

(86) PCT No.: PCT/IB2010/055324
§ 371 (c)(1),
(2), (4) Date: Apr. 12, 2013

(87) PCT Pub. No.: WO2012/069872
PCT Pub. Date: May 31, 2012

(65) Prior Publication Data
US 2013/0227256 A1    Aug. 29, 2013

(51) Int. Cl.
| | |
|---|---|
| *G06F 9/44* | (2006.01) |
| *G06F 9/00* | (2006.01) |
| *G06F 9/30* | (2006.01) |
| *G06F 11/36* | (2006.01) |

(52) U.S. Cl.
CPC ....... *G06F 9/30054* (2013.01); *G06F 11/3636* (2013.01); *G06F 11/3648* (2013.01)

(58) Field of Classification Search
None
See application file for complete search history.

(56) References Cited

U.S. PATENT DOCUMENTS

| | | |
|---|---|---|
| 5,790,846 A | 8/1998 | Mealey et al. |
| 6,263,489 B1 | 7/2001 | Olsen et al. |
| 6,587,967 B1 * | 7/2003 | Bates ............ G06F 11/3664 714/35 |
| 6,681,384 B1 * | 1/2004 | Bates ............ G06F 9/52 714/35 |
| 7,506,206 B2 | 3/2009 | Pedersen |
| 7,552,425 B2 | 6/2009 | Bates et al. |
| 7,574,585 B1 | 8/2009 | Nekl |

(Continued)

FOREIGN PATENT DOCUMENTS

WO    2015079291 A1    6/2015

OTHER PUBLICATIONS

International Search Report and Written Opinion correlating to PCT/IB2010/055324 dated Aug. 1, 2011.

(Continued)

*Primary Examiner* — Michael Sun

(57) ABSTRACT

A method for setting one or more breakpoints within executable program code of an embedded device is described. The method comprises copying at least one area of non-volatile memory (NVM) of the embedded device, comprising at least one instruction at which a breakpoint is to be set, into at least one area of overlay memory replacing within the overlay memory the at least one instruction at which a breakpoint is to be set with a breakpoint operation code, and enabling a mapping of the at least one area of NVM, comprising the at least one instruction at which a breakpoint is to be set, to the at least one area of overlay memory during execution of the program code within the embedded device.

20 Claims, 4 Drawing Sheets

(56) References Cited

U.S. PATENT DOCUMENTS

| | | | |
|---|---|---|---|
| 7,827,540 B2 | 11/2010 | Lien et al. | |
| 8,091,075 B2 | 1/2012 | Bates et al. | |
| 8,117,587 B1* | 2/2012 | Testardi | G06F 8/447 717/100 |
| 8,635,603 B2 | 1/2014 | Gooding et al. | |
| 8,756,577 B2* | 6/2014 | Bates | G06F 11/362 717/124 |
| 8,832,666 B2 | 9/2014 | Singh et al. | |
| 2002/0199173 A1* | 12/2002 | Bowen | G06F 11/362 717/129 |
| 2003/0154430 A1* | 8/2003 | Allen | G06F 11/364 714/45 |
| 2003/0208746 A1 | 11/2003 | Bates et al. | |
| 2004/0083458 A1 | 4/2004 | Gschwind | |
| 2005/0066313 A1 | 3/2005 | Bates et al. | |
| 2005/0066314 A1 | 3/2005 | Bates et al. | |
| 2006/0069959 A1 | 3/2006 | Schultz | |
| 2006/0174163 A1 | 8/2006 | Gravoille | |
| 2006/0190769 A1 | 8/2006 | Doddapaneni | |
| 2006/0200701 A1* | 9/2006 | Callender | G06F 11/3636 714/38.11 |
| 2007/0011431 A1* | 1/2007 | Hogdal | G06F 11/3644 711/207 |
| 2008/0250397 A1* | 10/2008 | Dahms | G06F 11/3624 717/129 |
| 2008/0320247 A1* | 12/2008 | Morfey | G06F 1/24 711/154 |
| 2010/0077385 A1 | 3/2010 | Assad et al. | |
| 2010/0100715 A1 | 4/2010 | Gooding et al. | |
| 2011/0225394 A1 | 9/2011 | Mital et al. | |
| 2013/0007716 A1 | 1/2013 | Bates | |

OTHER PUBLICATIONS

Buck, B. et al., "An API for Runtime Code Patching," ACM International Journal of High Performance Computing Aplications, 2000, 12 pages.

Magnusson et al., "Simics: A Full System Simulation Platform," IEEE Computer, vol. 35, issue 2; Feb. 2002, 9 pages.

U.S. Appl. No. 14/672422, Muloiu, D. et al., "Method of Testing Software", Office Action—Non-Final Rejection, mailed Oct. 23, 2015.

U.S. Appl. No. 14/672422, Muloiu, D. et al., "Method of Testing Software", Office Action—Final Rejection, mailed Jun. 6, 2016.

U.S. Appl. No. 15/036234, Nistor, M. et al., "Code Injection for Conditional Breakouts", filed May 12, 2016.

* cited by examiner

METHOD FOR SETTING BREAKPOINTS, AND AN INTEGRATED CIRCUIT AND DEBUG TOOL THEREFOR

FIELD OF THE INVENTION

The field of this invention relates to a method for setting breakpoints, and in particular to a method for setting breakpoints within executable program code of an embedded device and an integrated circuit and a debug tool therefor.

BACKGROUND OF THE INVENTION

In the field of embedded signal processing systems, it is common to use breakpoints to control an execution of code using an external debug tool, whereby a breakpoint is an intentional stopping or pausing position in program code, typically positioned within the code for debugging purposes. Breakpoints provide a means of acquiring information about a program during its execution. There are two types of breakpoints that are typically supported by debug tools currently available within the industry; software and hardware breakpoints.

Hardware breakpoints can be set for instructions and data stored within both non-volatile memory (NVM) and volatile memory, but require dedicated hardware resources, for example hardware comparators and breakpoint address registers, to be provided within the embedded system. Accordingly, hardware breakpoints are typically limited in terms of the quantity of breakpoints that may be set. Due to the cost & resource impact of implementing hardware breakpoints, previous generations of microcontroller designs have typically been limited to around four hardware breakpoints being able to be set. The next generation of embedded systems are pushing the number of hardware breakpoints available to eight, at the expense of the extra hardware resources that are required.

Software breakpoints can only be set for instructions and data stored within a volatile memory. For software breakpoints, a debug tool typically replaces the instruction corresponding to the address at which the breakpoint is to be set with an instruction that alerts, say, the central processing unit (CPU) of the embedded system to the breakpoints, and, thus, the CPU (or dedicated debug hardware) is able to signal to the external debug tool. The quantity of software breakpoints is effectively unlimited, which provides an advantage over hardware breakpoints.

However, non-volatile memory, such as Flash memory, cannot readily be overwritten on an instruction level resolution without seriously impacting the application under test. For example, for some applications a breakpoint operation code may comprise, say, all '0' values. For Flash architectures in which memory cells may be set to '0' on say, a one-bit resolution, setting such breakpoints may be simply implemented by overwriting an instruction with a breakpoint operation code (i.e. setting all the memory cells for that instruction address to '0' values. However, as is well known in the art, in order to 'clear' any memory cell within a Flash memory array (i.e. to reset a memory cell to a '1' value for the above example), it is necessary to clear an entire flash page of memory cells, and to subsequently re-write the entire flash page back in to memory to restore any data stored within that flash page. Thus, clearing any breakpoint would require an entire flash page to be cleared and rewritten.

For applications in which the breakpoint operation code comprises anything but all '0' values for the above flash example, it would also be necessary to clear and re-write an entire flash page to set a breakpoint.

Another problem with setting software breakpoints within flash memory is that, if the flash memory is implemented with error correction code (ECC) functionality, overwriting an instruction within the memory with a breakpoint may cause an ECC failure. As a result, software breakpoints are typically not able to be used for NVM based code.

Significantly, the majority of embedded systems typically use 'on-chip' flash memory for program storage, thereby forcing the inclusion of hardware logic to implement hardware breakpoints for debugging. As such, the use of breakpoints for debugging such flash based code is inherently limited in terms of the quantity of breakpoints that may be set.

In addition, the cost in terms of hardware resources for enabling hardware breakpoints is becoming increasingly significant with the technology trend towards using multi-core systems, where a memory area is often shared between multiple processing cores (e.g. CPUs). For such multi-core systems, in order to set a breakpoint on a given address within an area of shared NVM memory, it is necessary for breakpoint hardware to be provided for each processing core.

SUMMARY OF THE INVENTION

The present invention provides a method for setting breakpoints within executable program code of an embedded device, an integrated circuit and a debug tool as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

The present invention will now be described with reference to an example of an embedded device adapted in accordance with some embodiments of the present invention. However, it will be appreciated that the present invention is not limited to the specifics of the illustrated examples, and may be equally applied within embedded devices comprising alternative architectures and designs. For example, due to the trend towards multi-core systems, an example of an implementation of the present invention is hereafter described with reference to a multi-core system. However, it will be appreciated that the present invention is equally applicable to a single-core system.

Figure 1:
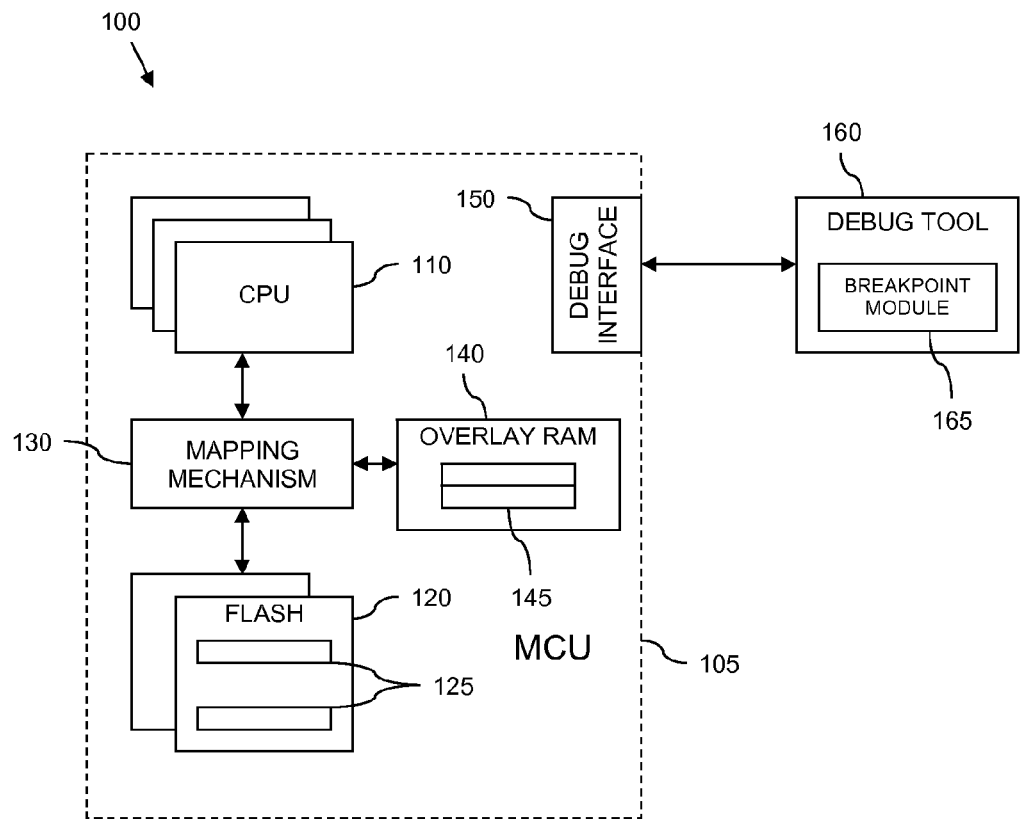
FIG. 1 illustrates an example of an embedded device.

Referring first to FIG. 1, there is illustrated an example of an embedded device 100 adapted in accordance with some example embodiments of the present invention, and implemented within an integrated circuit device 105. For the illustrated example, the embedded device 100 comprises a micro-controller unit (MCU) comprising multiple signal processing cores, which for the illustrated example are in a form of central processing units (CPUs) 110. The CPUs 110 are operably coupled to one or more non-volatile memory (NVM) elements 120, which for the illustrated example comprise Flash memory elements.

It is known for conventional embedded devices, in particular those targeted at automotive applications, to comprise a feature called 'overlay memory' or 'calibration memory', typically comprising a small amount of volatile memory such as RAM (random access memory). By way of software configuration of the micro-controller, this volatile memory may be memory-mapped to cover one or more areas of NVM, such as the Flash memory 120 illustrated in FIG. 1, to allow data accessed during calibration to be more easily manipulated, for example by an external debug/calibration tool 160. When such a conventional device is not under calibration conditions, for example in the case of a production device, such overlay/calibration memory is typically unused.

However, referring back to FIG. 1, the example MCU embedded device 100 further comprises overlay memory 140 and memory mapping logic or memory mapping module, dependent upon hardware, software or firmware implementation (hereinafter referred to as memory mapping logic/module 130), arranged to map one or more areas of NVM 120 to the overlay memory 140. Specifically, the memory mapping logic/module 130 and overlay memory 140 may be arranged to enable such memory mapping during a calibration procedure to allow data that is accessed during calibration to be more easily manipulated, for example by use of an external debug/calibration tool. The MCU embedded device 100 also comprises a debug interface 150 to enable an external debug tool 160 to be operably coupled to the MCU embedded device 100.

Until recently, such overlay memory has been very limited in terms of the granularity with which it may be divided into individual areas, and in some cases limited to access by a CPU data bus only. Accordingly, such overlay memory has traditionally been of little use to end users. However, next generation devices are expected to enable such overlay memory to be capable of a significantly reduced granularity with which they may be divided into individual areas, for example with the ability to be split into '32' discrete areas. In addition, it is expected that the next generation of devices will also be accessible by a CPU instruction bus. Accordingly, it is contemplated that the example overlay memory 140 of the MCU embedded device 100 of FIG. 1 may be accessible by both a CPU data bus and a CPU instruction bus.

For clarity and ease of description, the overlay memory 140 for the illustrated example of FIG. 1 comprises a dedicated overlay RAM element. However, in some examples, the overlay memory 140 may equally be implemented by way of an unused portion of standard system RAM. Accordingly, references to the overlay memory, including references thereto within the claims, are to be understood as comprising either dedicated overlay memory, such as the overlay memory 140 illustrated in FIG. 1, and/or to a portion of standard system RAM allocated for providing overlay functionality.

Figure 2:
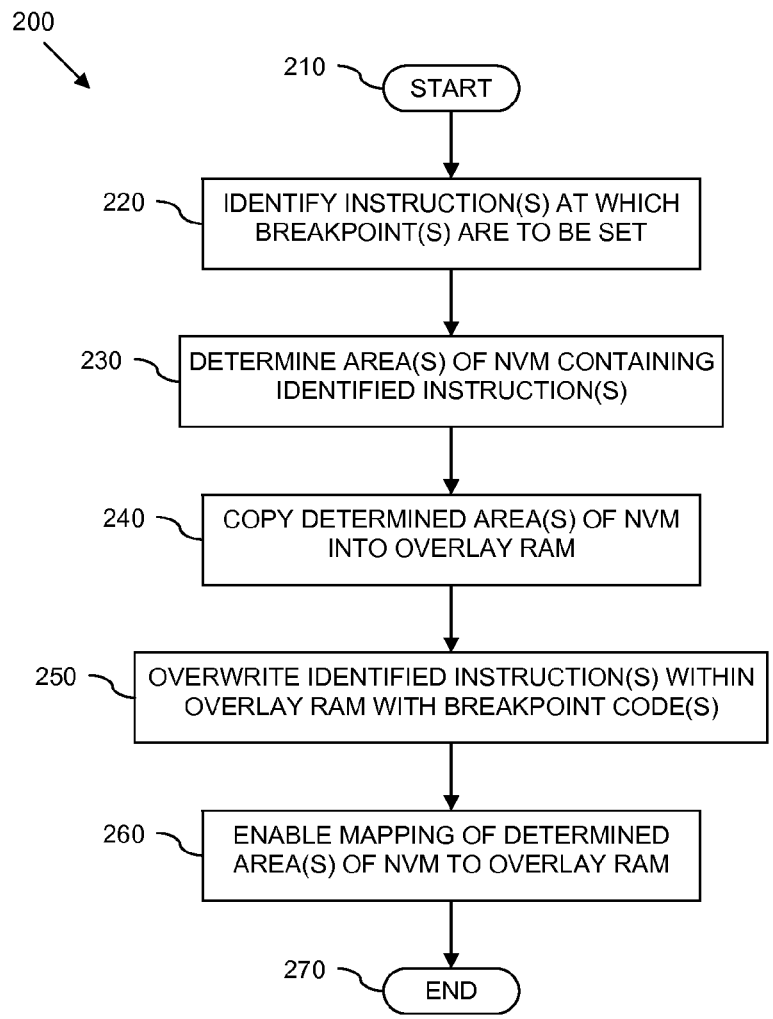
FIG. 2 illustrates a simplified flowchart of a method for setting breakpoints within executable program code of an embedded device.

Referring now to FIG. 2, there is illustrated a simplified flowchart 200 of an example method for setting breakpoints within executable program code of an embedded device, for example the MCU embedded device 100 of FIG. 1, in accordance with some example embodiments of the present invention. The method starts at step 210, and moves on to step 220 where one or more instructions within the executable program code at which a breakpoint is to be set is/are identified. For example, such instructions may be identified within a breakpoint module 165 of the debug tool 160 of FIG. 1, whereby a user identifies such instructions within the executable program code by way of a user interface (not shown) of the debug tool 160.

Having identified the instruction(s) at which a breakpoint is to be set, the method moves on to step 230, where one or more areas 125 of NVM (Flash memory) 120 of the MCU embedded device 100, comprising (in use) the one or more identified instruction(s) at which a breakpoint is to be set, is/are determined. Such breakpoint(s) is/are to be mapped to one or more areas 145 of overlay memory 140 during execution of the program code within the MCU embedded device 100 of FIG. 1. For example, such a determination may be based on one or more of:

a distribution of the identified instruction(s) within the executable program code;

a granularity with which the overlay memory 140 may be split into individual areas 145; and/or the size of the overlay memory 140.

Next, at step 240, the method comprises copying the determined area(s) 125 of NVM (Flash memory) 120 of the MCU embedded device 100, comprising the identified instruction(s) at which a breakpoint is to be set, into overlay memory 140. For example, the breakpoint module 165 of the debug tool 160 of FIG. 1 may be arranged to read executable program code from the determined areas 125 of the Flash memory 120, and to write or otherwise load the read executable program code into respective areas 145 of the overlay memory 140.

Having copied the determined area(s) 125 into the overlay memory 140, the method comprises replacing (e.g. over-writing) within the overlay memory 140 the identified instruction(s) at which a breakpoint is to be set with a breakpoint operation code at step 250. For example, the breakpoint module 165 of the debug tool 160 of FIG. 1 may be arranged to over-write within the overlay memory 140 the identified instruction(s) at which a breakpoint is to be set with a breakpoint operation code.

The method then moves on to step 260, where the mapping of the determined area(s) 125 of NVM (Flash memory) 120 to the overlay memory 140 during execution of the program code within the MCU embedded device 100 is enabled. For example, enabling a mapping of the determined area(s) 125 of Flash memory 120 to the respective areas 145 of the overlay memory 140 may comprise initialising the memory mapping mechanism 130 to map the determined area(s) 125 of Flash memory 120 to the respective areas 145 of the overlay memory 140 during execution of the program code within the MCU embedded device 100. Such initialisation of the memory mapping logic/module 130 may be performed by, say, the breakpoint module 165 of the debug tool 160. The method then ends at step 270.

Thus, a method for setting breakpoints within executable program code of an embedded device has been described, the method comprising copying at least one area of non-volatile memory (NVM) of the embedded device comprising at least one instruction at which a breakpoint is to be set into an area of overlay memory. The method further comprises replacing within the overlay memory the at least one instruction at which a breakpoint is to be set with a breakpoint operation code, and enabling the mapping of the at least one area of NVM, comprising the at least one instruction at which a breakpoint is to be set, to the area of overlay memory during execution of the program code within the embedded device.

Figure 3:
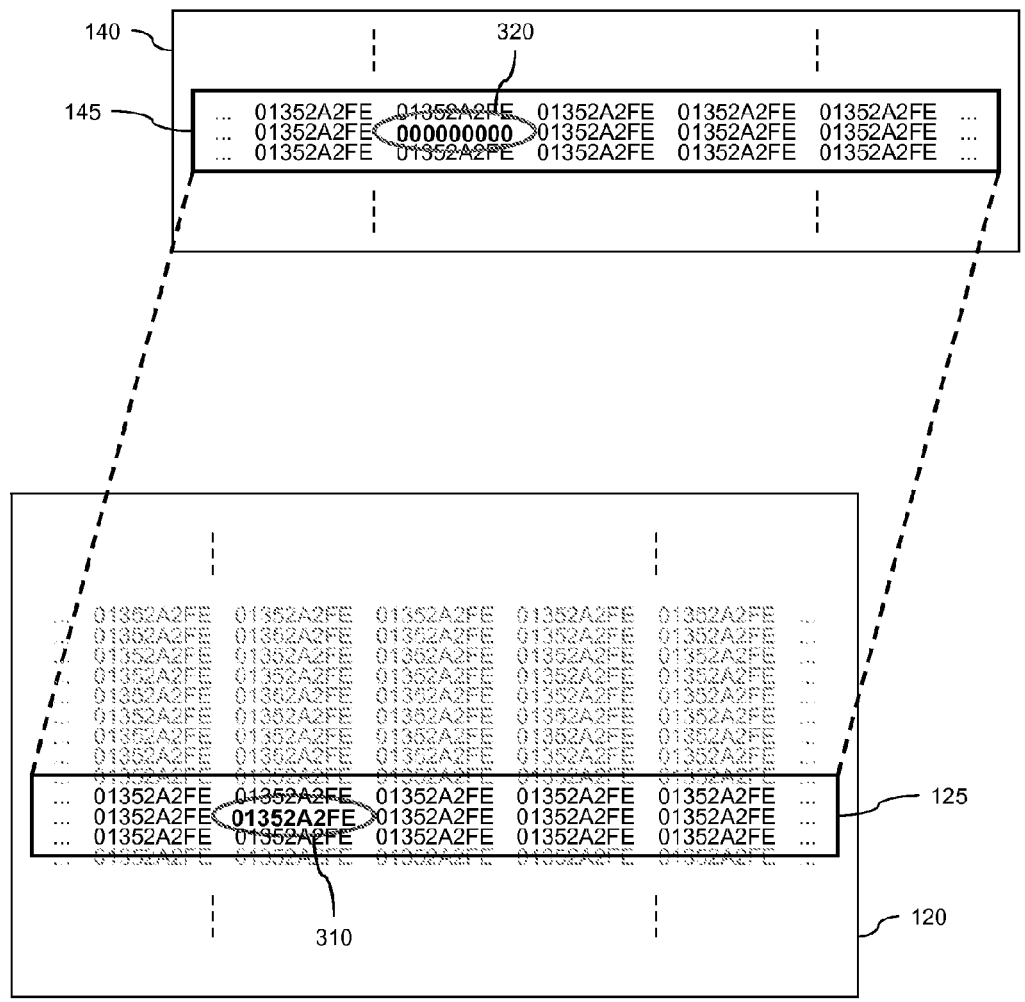
FIG. 3 illustrates an example of setting a breakpoint within the embedded device of FIG. 1.

In this manner, and as illustrated more clearly in FIG. 3, and with reference to FIG. 1 an area 125 of NVM memory 120 comprising one or more identified instructions at which a breakpoint is to be set, such as instruction 310 illustrated in FIG. 3, may be copied into an area 145 of the overlay memory 140. A software breakpoint may then be set within the overlay memory 140 by simply over-writing the identified instruction 310 with a breakpoint operation code, such as illustrated at 320 (namely the breakpoint operation code for the illustrated example comprising a string of '0' Values—0x0). By subsequently causing the area 125 of NVM memory 120 containing the identified instruction 310 to be mapped to the respective area 145 of overlay memory 140 during execution of the program code, when a CPU 110 of the MCU embedded device 100 attempts to access the program code within the area 125 of NVM 125, the CPU 110 access will be re-directed to the code within the respective area 145 of overlay memory 140 to which it is mapped. In this manner, when the CPU 110 executes the program code within the area 145 of overlay memory 140, upon reaching that part of the executable code that would have comprised the instruction 310 within NVM memory 120, it executes instead the breakpoint operating code, and thus a breakpoint is executed by the CPU 110.

Significantly, the method hereinbefore described enables software breakpoints to be used during execution of program code stored within NVM memory, such as Flash memory, without a need for such breakpoints to be set within the actual NVM memory. In some examples, this may alleviate some problems associated with traditional techniques for implementing software breakpoints with NVM memory, such as reducing or minimising the significant impact that traditional techniques have on the execution of program code under test due to a previous need for clearing entire pages of memory at a time, and/or causing error correction code (ECC) failures.

In particular, for traditional techniques in setting software breakpoints, in order to subsequently clear a breakpoint set within NVM memory, it would have been necessary to clear an entire page of the NVM memory containing the breakpoint, and then to re-write the data for the whole page, including the original instruction that had previously been over-written with the breakpoint. However, for the method hereinbefore described, because the breakpoint has not been set within NVM memory 120, but rather within the overlay memory 140, the need for one or more breakpoints to be cleared from NVM memory 120 has been substantially alleviated. Instead, one or more breakpoints may simply be cleared by disabling a mapping operation of the respective areas 125 of NVM to the overlay memory 140.

Figure 4:
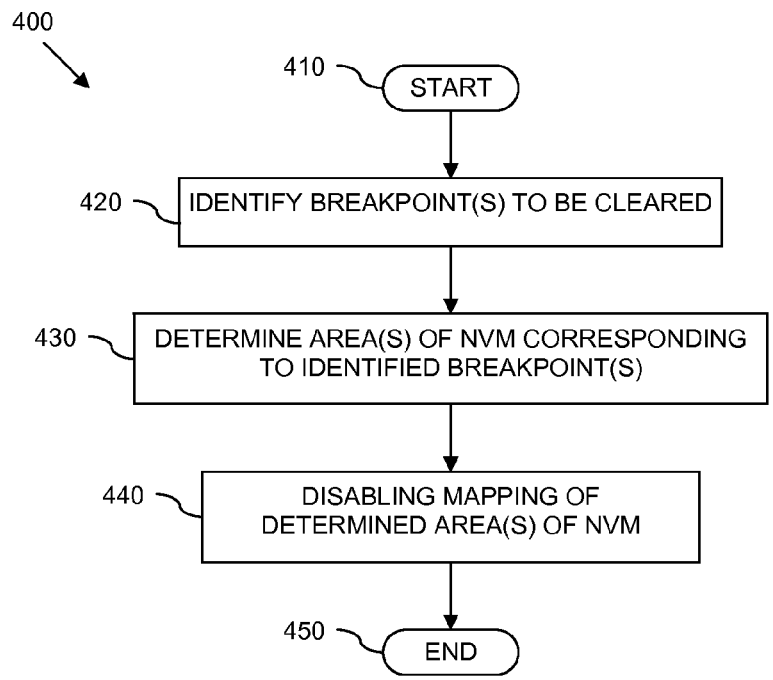
FIG. 4 illustrates an example of a simplified flowchart of a method for clearing breakpoints.

FIG. 4 illustrates an example of a simplified flowchart 400 of such a method for clearing breakpoints set within the overlay memory 140, according to some example embodiments of the present invention. The method starts at step 410, and moves on to step 420, where one or more breakpoints to be cleared is/are identified. Next, at step 430, the respective one or more area(s) 125 of NVM memory 120 to which the identified breakpoint(s) correspond is/are determined. The mapping of this/these one or more determined area(s) is then disabled, at step 440, for example by way of appropriate configuration of the memory mapping logic/module 130 of FIG. 1. The method then ends at step 450. In this manner, when a CPU 110 of FIG. 1 attempts to access the area 125 of NVM memory 120, to which the identified breakpoint(s) correspond, such an access is no longer re-directed to the overlay memory 140, and the CPU 110 may directly access the unaltered (i.e. comprising no breakpoints) executable program code within the NVM memory 120.

Additionally and/or alternatively, a breakpoint may simply be cleared within the overlay memory 140, which typically comprises volatile memory such as RAM where data may be modified at a bit level without a need for entire pages of data to be cleared, etc.

Figure 5:
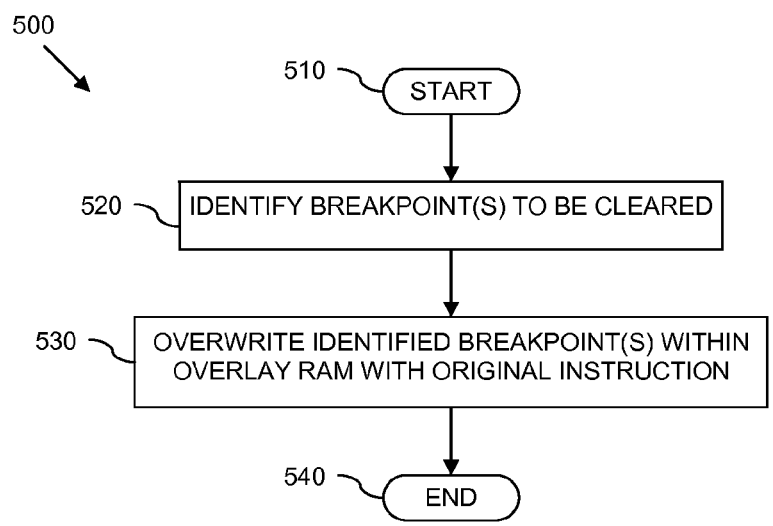
FIG. 5 illustrates an alternative example of a simplified flowchart of a method for clearing breakpoints.

FIG. 5 illustrates an example of a simplified flowchart 500 of such a method for clearing breakpoints set within, say, the overlay memory 140 of FIG. 1, according to some example embodiments of the present invention. The method starts at step 510, and moves on to step 520, where one or more breakpoints to be cleared is/are identified. Next, at step 530, the identified one or more breakpoint(s) is/are simply over-written within the overlay memory 140, with the original instruction(s) previously over-written with a breakpoint operation code. The method then ends, at step 540.

In some examples, the number of breakpoints that may be set using the hereinbefore described method of the present invention may depend upon one or more of several factors, such as a size of the overlay memory 140 of FIG. 1, the size and/or number (granularity) of the individual areas that the overlay memory 140 may be divided into, the distribution of the instructions within the program code at which breakpoints are to be set, etc. In particular, the minimum number of breakpoints that may be set may be limited to a number of individual areas that the overlay memory 140 may be divided into, since each individual area of the overlay memory 140 may be capable of being used to store at least one breakpoint. Thus, in some examples, if the overlay memory 140 comprises 'N' individual areas 145 of memory that is/are available for breakpoints, then the minimum number of breakpoints that may be set is 'N'.

It is expected that the next generation of embedded devices may comprise overlay memory that is capable of a significantly reduced granularity with which they may be divided into individual areas, for example with an ability to be split into, say, '32' discrete areas. Accordingly, for such embedded devices, the minimum number of breakpoints that may be set using the hereinbefore described method will be, say, in the region of '32', thereby significantly more than would otherwise be available if the setting of breakpoints within the NVM of such devices was limited to the use of current hardware breakpoints. Furthermore, where instructions at which breakpoints are to be set are located sufficiently close to one another to be able to be contained within a single area of overlay memory, then more than one breakpoint may be set within each area of overlay memory. Accordingly, the number of breakpoints may be significantly greater than 'N', dependent upon a distribution of the instructions within the program code at which breakpoints are to be set, and the relative size of the individual areas of the overlay memory. In accordance with some example embodiments of the present invention, only a part of the overlay memory 140 may be used for enabling the setting of one or more breakpoints within executable program code as hereinbefore described, with a remainder of the overlay memory 140 being available for other purposes, for example for storing debug trace, etc.

As will be appreciated by a skilled artisan, in accordance with some example embodiments of the present invention, the various steps hereinbefore described for setting one or more breakpoints within executable program code of an embedded device may be implemented within a debug tool, such as within the breakpoint module 165 of the debug tool 160 of FIG. 1. Accordingly, such examples of the present invention may be implemented with minimal (if any) modification being required to existing or next generation embedded device architectures, so long as such embedded devices comprise memory mapping functionality, including a corresponding area of overlay memory (e.g. RAM) from which instructions may be accessed (e.g. to which an instruction bus has access).

Thus, according to one example aspect of the present invention there is provided a debug tool for setting one or more breakpoints within executable program code of an embedded device. The debug tool may be arranged to copy at least one area of non-volatile memory of the embedded device, comprising at least one instruction at which a breakpoint is to be set, into an area of overlay memory. The debug tool may also replace the at least one instruction at which a breakpoint is to be set within the overlay memory with a breakpoint operation code, and enable the mapping of the at least one area of non-volatile memory comprising the at least one instruction at which a breakpoint is to be set to the area of overlay memory during execution of program code within the embedded device.

Because the illustrated example embodiments of the present invention may, for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; non-volatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, a plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, for clarity and ease of understanding, the mapping logic/module 130 and overlay memory 140 have been illustrated as discrete logical components. However, it will be appreciated that the mapping logic/module and/or the overlay memory 140 may comprise integral parts of one or more other components within the embedded device.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediary components. Likewise, any two components so associated can also be viewed as being "operably connected", or "operably coupled", to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an", as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an". The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A method for setting one or more breakpoints within executable program code of an embedded device, the method comprising:

copying at least one area of non-volatile memory (NVM) of the embedded device, comprising at least one instruction at which a breakpoint is to be set, into at least one area of overlay memory to be memory-mapped by mapping hardware of the embedded device to cover the at least one area of NVM;

replacing within the at least one area of overlay memory the at least one instruction at which a breakpoint is to be set with a breakpoint operation code to be executed by at least one processor core of the embedded device; and enabling the mapping hardware of the embedded device to map the at least one area of NVM, comprising the at least one instruction at which a breakpoint is to be set, to the at least one area of overlay memory during execution of the program code within the embedded device by the at least one processor core.

2. The method of claim 1 wherein the method further comprises identifying at least one instruction within the program code to be executed by the embedded device at which a breakpoint is to be set, and determining at least one area of NVM of the embedded device, comprising the at least one identified instruction at which a breakpoint is to be set, to be mapped to the at least one area of overlay memory during execution of the program code within the embedded device based at least partly on at least one from a group consisting of:

a distribution of identified instruction(s) within the executable program code;

a granularity with which the overlay memory may be split into individual areas; and the size of the overlay memory.

3. The method of claim 1 wherein copying the at least one area of NVM of the embedded device comprises, within a debug tool operably coupled to the embedded device, reading executable program code from the at least one area of NVM of the embedded device and writing the read content into the overlay memory.

4. The method of claim 3 wherein replacing within the overlay memory the at least one instruction at which a breakpoint is to be set with a breakpoint operation code comprises, within the debug tool operably coupled to the embedded device, over-writing within the overlay memory the at least one instruction at which a breakpoint is to be set with a breakpoint operation code.

5. The method of claim 1 wherein enabling the mapping of the at least one area of NVM comprises initializing a memory mapping mechanism to map the at least one area of NVM to the at least one area of overlay memory during execution of the program code within the embedded device.

6. The method of claim 1 further comprising clearing a breakpoint by disabling the mapping of the at least one area of non-volatile memory comprising an instruction at which the breakpoint has been set to the at least one area of overlay memory.

7. The method of claim 1 wherein the method further comprises clearing a breakpoint by replacing the breakpoint operation code within the overlay memory with an original instruction previously replaced by the breakpoint operation code.

8. The method of claim 2 wherein copying the at least one area of NVM of the embedded device comprises, within a debug tool operably coupled to the embedded device, reading executable program code from the at least one area of NVM of the embedded device and writing the read content into the overlay memory.

9. The method of claim 2 wherein enabling the mapping of the at least one area of NVM comprises initializing a memory mapping mechanism to map the at least one area of NVM to the at least one area of overlay memory during execution of the program code within the embedded device.

10. The method of claim 3 wherein enabling the mapping of the at least one area of NVM comprises initializing a memory mapping mechanism to map the at least one area of NVM to the at least one area of overlay memory during execution of the program code within the embedded device.

11. The method of claim 4 wherein enabling the mapping of the at least one area of NVM comprises initializing a memory mapping mechanism to map the at least one area of NVM to the at least one area of overlay memory during execution of the program code within the embedded device.

12. The method of claim 2 further comprising clearing a breakpoint by disabling the mapping of the at least one area of non-volatile memory comprising an instruction at which the breakpoint has been set to the at least one area of overlay memory.

13. The method of claim 3 further comprising clearing a breakpoint by disabling the mapping of the at least one area of non-volatile memory comprising an instruction at which the breakpoint has been set to the at least one area of overlay memory.

14. The method of claim 4 further comprising clearing a breakpoint by disabling the mapping of the at least one area of non-volatile memory comprising an instruction at which the breakpoint has been set to the at least one area of overlay memory.

15. The method of claim 5 further comprising clearing a breakpoint by disabling the mapping of the at least one area of non-volatile memory comprising an instruction at which the breakpoint has been set to the at least one area of overlay memory.

16. The method of claim 2 wherein the method further comprises clearing a breakpoint by replacing the breakpoint operation code within the overlay memory with an original instruction previously replaced by the breakpoint operation code.

17. The method of claim 3 wherein the method further comprises clearing a breakpoint by replacing the breakpoint operation code within the overlay memory with an original instruction previously replaced by the breakpoint operation code.

18. The method of claim 4 wherein the method further comprises clearing a breakpoint by replacing the breakpoint operation code within the overlay memory with an original instruction previously replaced by the breakpoint operation code.

19. A debug tool for setting one or more breakpoints within executable program code of an embedded device, the debug tool being configured to:
   copy at least one area of non-volatile memory (NVM) of the embedded device, comprising at least one instruction at which a breakpoint is to be set, into at least one area of overlay memory to be memory-mapped by mapping hardware of the embedded device to cover the at least one area of NVM;
   replace the at least one instruction at which a breakpoint is to be set within the at least one area of the overlay memory with a breakpoint operation code; and
   enable the mapping hardware of the embedded device to map the at least one area of non-volatile memory comprising the at least one instruction at which a breakpoint is to be set to the at least one area of overlay memory during execution of program code within the embedded device.

20. An integrated circuit comprising an embedded device having executable program code and an interface for operably coupling to a debug tool; wherein the embedded device comprises:
   at least one processor core;
   a mapping hardware, at least one area of non-volatile memory (NVM) comprising at least one instruction at which a breakpoint is to be set;
   at least one area of overlay memory; and
   a mapping module;
   wherein, in response to control via the interface the at least one area of NVM is copied into the at least one area of the overlay memory to be memory-mapped by the mapping hardware to cover the at least one area of NVM and the at least one instruction is replaced with a breakpoint operation code and the mapping module, using the mapping hardware, maps the at least one area of NVM to the at least one area of overlay memory during execution of program code within the embedded device by the at least one processor core.

* * * * *